United States Patent [19]

Dumarot et al.

[11] Patent Number: 5,463,755
[45] Date of Patent: Oct. 31, 1995

[54] HIGH-PERFORMANCE, MULTI-BANK GLOBAL MEMORY CARD FOR MULTIPROCESSOR SYSTEMS

[75] Inventors: Daniel P. Dumarot, Washingtonville; Armando Garcia, Yorktown Heights, both of N.Y.

[73] Assignee: International Business Machines Corporation, Armonk, N.Y.

[21] Appl. No.: 263,746

[22] Filed: Jun. 22, 1994

Related U.S. Application Data

[63] Continuation of Ser. No. 700,679, May 28, 1991, abandoned.

[51] Int. Cl.⁶ .......................... G06F 13/16; G06F 12/14; G06F 11/10
[52] U.S. Cl. .................... 395/475; 395/287; 395/405; 395/421.08; 395/432; 395/478; 395/479; 395/484; 395/485; 395/497.04; 395/183.08; 395/183.05; 364/DIG. 1; 364/228.1; 364/238.4; 364/242.91; 364/242.92; 364/246.4; 364/246.8; 364/254.8; 364/265; 364/282
[58] Field of Search ......................... 395/425, 575, 395/325; 364/DIG. 1

[56] References Cited

U.S. PATENT DOCUMENTS

| | | | |
|---|---|---|---|
| 3,820,079 | 6/1974 | Bergh et al. | 395/325 |
| 3,905,023 | 9/1975 | Perpiglia | 395/575 |
| 3,916,383 | 10/1975 | Malcolm | 395/650 |
| 4,005,389 | 1/1977 | Penzel | 395/425 |
| 4,253,144 | 2/1981 | Bellamy et al. | 395/425 |
| 4,562,535 | 12/1985 | Vincent et al. | 395/325 |
| 4,589,067 | 5/1986 | Porter et al. | 395/800 |
| 4,783,736 | 11/1988 | Ziegler et al. | 395/425 |
| 4,794,521 | 12/1988 | Ziegler et al. | 365/425 |
| 4,796,232 | 1/1989 | House | 365/189.03 |
| 4,797,815 | 1/1989 | Moore | 395/325 |
| 4,891,749 | 1/1990 | Hoffman et al. | 395/425 |
| 4,918,645 | 4/1990 | Lagoy, Jr. | 395/425 |
| 4,933,846 | 6/1990 | Humphrey et al. | 395/325 |
| 5,136,717 | 8/1992 | Morley et al. | 395/800 |
| 5,175,836 | 12/1992 | Morgan | 395/425 |
| 5,210,723 | 5/1993 | Bates et al. | 365/238.5 |
| 5,263,146 | 11/1993 | Mishima | 395/425 |
| 5,283,870 | 2/1994 | Joyce et al. | 395/200 |
| 5,335,234 | 8/1994 | Matteson et al. | 371/40.1 |

FOREIGN PATENT DOCUMENTS

| | | |
|---|---|---|
| 2537787 | 3/1977 | Germany . |
| 60-086647 | 5/1985 | Japan . |
| 61-042793 | 1/1986 | Japan . |
| 61-177559 | 9/1986 | Japan . |

*Primary Examiner*—Glenn Gossage
*Assistant Examiner*—Reginald G. Bragdon
*Attorney, Agent, or Firm*—Sterne, Kessler, Goldstein & Fox; Richard M. Ludwin

[57] ABSTRACT

A multi-bank global memory system (GMS) for use with a multiprocessor computer system having a global bus. The GMS includes up to four global memory cards (GMCs) connected to the global bus. The GMCs are independently accessed. Each of the GMCs includes a common interface for buffering memory accesses and read reply data. Each of the GMCs also includes four memory banks. The common interface and memory banks are connected via a local bus. The memory banks are interleaved and are independently scheduled and accessed. The common interface and memory banks are each capable of performing posted write cycles and independently supplying read reply data subsequent to read requests. The common interface is capable of buffering, simultaneously, up to 8 writes per bank and 8 read replies per bank.

23 Claims, 9 Drawing Sheets

HIGH-PERFORMANCE, MULTI-BANK GLOBAL MEMORY CARD FOR MULTIPROCESSOR SYSTEMS

This application is a continuation of application Ser. No. 07/700,679, filed May 28, 1991, now abandoned.

DESCRIPTION

1. Technical Field

The present invention relates generally to memory subsystems for computer systems, and more particularly to multi-bank, global (that is, shared) memory subsystems for multiprocessor computer systems.

2. Background of the Invention

In many multiprocessor computer systems, processors operate at faster speeds than main memory. Consequently, the processors are idle while they wait for the main memory to complete their memory requests.

Additionally, during a particular cycle, the processors often issue simultaneous memory access requests to the main memory. Consequently, the processors contend for the main memory. As a result, the processors are idle while the contention among their simultaneous memory access requests is resolved.

This processor idle time, described above, is a deterrent to achieving high computational speeds in the multiprocessor computer systems.

A prior solution to the above problem involves the use of an interleaved memory system. The interleaved memory system contains multiple memory banks connected to a global bus.

According to the prior solution, the main memory is partitioned among the memory banks. As a result, different processors may simultaneously access the main memory provided that they reference different memory banks. Therefore, the prior solution reduces the processor idle time. The structure and operation of conventional interleaved memory systems are well known.

The amount of simultaneous main memory accessing increases with the amount of main memory partitioning. For example, if the main memory is partitioned among four memory banks, then four simultaneous main memory accesses are possible. If the main memory is partitioned among eight memory banks, then eight simultaneous main memory accesses are possible. In other words, the processor idle time decreases as main memory partitioning increases.

Conventionally, each memory bank has its own addressing circuitry. The addressing circuitry increases the cost of the multiprocessor computer systems.

Also, the computer boards containing the memory banks must contain small amounts of memory in order to minimize latency and access time. Therefore, a large number of computer boards are required to realize a large main memory. In multiprocessor computer systems containing limited global bus slots, this may not be practical. Even if it is practical, this increases the cost of the multiprocessor computer systems.

Therefore, the prior solution is flawed because decreased processor idle time (and equivalently increased computational speeds) may only be achieved at increased expense.

SUMMARY OF THE INVENTION

The present invention is directed to a multi-bank global memory system (GMS) for use with a multiprocessor computer system having a global bus.

The GMS of the present invention includes the following features.

First, the GMS includes one or more global memory cards (GMC). The GMCs are placed on separate computer boards. Each GMC includes a common interface and four independent banks of memory. The common interface and memory banks are connected by a local bus. The operation of each memory bank and the common interface is completely independent except for the transfer of address and data information over the local bus.

This approach of placing four independent memory banks on a computer board with one common interface allows a large amount of memory to reside on the computer board without having to pay a large penalty in latency and access time.

Second, memory access requests (that is, read and write requests) to the GMCs are buffered in the common interfaces. Because the memory access requests are buffered in the common interfaces, cycles associated with a global bus (to which the GMCs are attached) may be decoupled from the scheduling of memory cycles by the memory bank. For read requests, the global bus cycles may be decoupled from the return of read reply data from the memory banks to the common interface.

Third, the GMS of the present invention uses a page mode associated with dynamic random access memories (DRAM) to reduce memory access time by a half (in a preferred embodiment of the present invention, from 8 cycles to 4 cycles).

The GMS of the present invention uses the page mode in two ways: block mode read mode (DMA mode) and near mode read and write cycles. In DMA mode, the starting address and the number of words to return are specified. The memory bank fetches the words and sends them to the common interface. The words are buffered in the common interface before being returned over the global bus.

According to a preferred embodiment of the present invention, while in DMA mode, the maximum read reply data bandwidth of each memory bank is 320 Mbytes per second. Thus, the theoretical aggregate maximum read reply bandwidth is 1280 Mbytes per second. However, the actual maximum data bandwidth is less as the local bus saturates at a read reply bandwidth of 640 Mbytes per second.

Memory banks perform near address reads and writes when, for a particular memory access, the next DRAM row address is the same as the current DRAM row address. The common interface does the compare of the current and next DRAM row addresses (on a bank by bank basis) and asserts a control signal when they are the same. The control signal informs the memory bank to stay in page mode.

According to a preferred embodiment of the present invention, while in near address mode, the maximum read reply and write data bandwidth of each memory bank is 320 Mbytes per second, yielding a theoretical aggregate maximum data bandwidth of 1280 Mbytes per second. However, the actual maximum data bandwidth is less because the local bus saturates when scheduling read or write cycles at slightly greater than 426 Mbyte per second.

Fourth, the GMS of the present invention can be automatically configured in any one of 4 interleave factors. The interleave factor is chosen from either 2 words, 8 words, 32 words, or 128 words, and is set at system power up. Thus, address decoding is a function of the selected interleave factor and the amount of memory in the GMS. Since the interleave factor is selectable, the GMS may be adjusted to optimize overall memory bandwidth for the loading placed upon it by the operating system and applications installed.

Fifth, the GMS of the present invention supports two methods of memory locking. By supporting memory locking, the GMS is suitable for use as a shared memory system in a multiprocessor environment.

Sixth, the GMCs of the GMS perform error detection and correction (EDC). In a preferred embodiment of the present invention, the GMCs detect single or double bit errors and correct single bit errors. One byte of error correcting code (ECC) is appended to each 4 bytes of memory in order to perform the EDC.

Seventh, the GMS of the present invention is designed to be used with either 1 Mbyte by 40 or 2 Mbyte by 40 single in line memory modules (SIMM). This results in a computer board with either 128 Mbytes or 256 Mbytes of memory.

Further features and advantages of the present invention, as well as the structure and operation of various embodiments of the present invention, are described in detail below with reference to the accompanying drawings, and in the claims. In the drawings, like reference numbers indicate identical or functionally similar elements.

DETAILED DESCRIPTION OF THE INVENTION

Structural Overview

Figure 1:
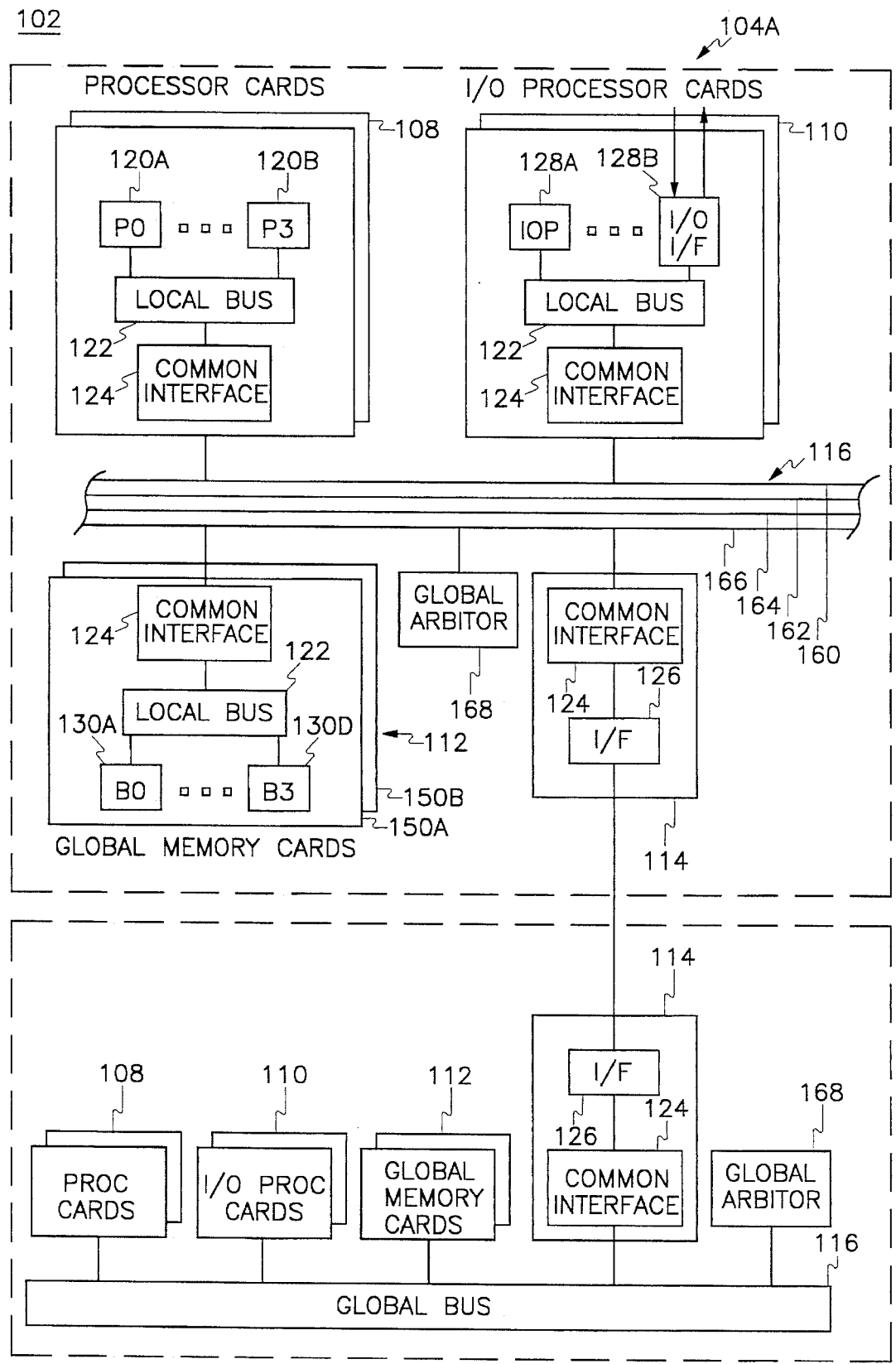
FIG. 1 illustrates a system 102 which contains a global memory system (GMS) 112 of the present invention.

FIG. 1 illustrates a system 102 which contains the global memory system (GMS) 112 of the present invention. The system 102 includes computers 104A, 104B. The GMS 112 serves as a shared memory for the computers 104A, 104B. The structure and operation of the computers 104, 104B are similar.

The computer 104A includes processor cards 108, input/output (I/O) processor cards 110, the GMS 112, a bus-to-bus adapter 114, and a global arbiter 168. The processor cards 108, input/output (I/O) processor cards 110, GMS 112, bus extender 114 (which allows the system 104A to attach to up to three other systems 104A, such as system 104B) and global arbiter 168 are connected to a global bus 116. In a preferred embodiment of the present invention, the global bus 116 contains 333 data lines 160, 55 address lines 162 and 7 control lines 164. One of the data lines 160, DCYCLE (data cycle), specifies when valid data is present on the data lines 160. One of the address lines 162, ACYCLE (address cycle), specifies when a valid address is present. The global arbiter 168 controls access to the global bus 116.

The data lines 160 include 32 data parity lines. The address lines 162 include 4 address parity lines. The data and address parity lines are used to protect the data and addresses contained in the data lines 160 and address lines 162.

The GMS 112 of the present invention includes global memory cards (GMC) 150. The GMCs 150 each contain a common interface 124 and memory banks 130. The memory banks 130 are connected to the common interface 124 via a local bus 122.

Note that the processor cards 108, input/output (I/O) processor cards 110, and bus-to-bus adapter 114 also include common interfaces 124. While similar, the structure and operation of the common interfaces 124 vary depending on the specific cards 108, 110, 112, 114 upon which they reside.

In a preferred embodiment of the present invention, and assuming the use of 4 Mbit dynamic random access memory (DRAM) technology, the GMS 112 has a maximum capacity of 1 gigabyte of DRAM (hereinafter referred to as 'memory') distributed over four GMCs 150. Each GMC 150 can have either 256 megabytes or 128 megabytes of memory.

The GMS 112 includes from one to four GMCs 150. Consequently, the GMS 112 is self-configuring with a minimum of 128 megabytes and a maximum of 1 gigabyte of memory.

The GMS 112 is made self-configuring by the interaction of four GM_MCARD (global memory card) signals 270 and two ISEL (interleave select) signals 222. Each GMC 150 asserts one of the GM_MCARD signals 270 depending upon which physical slot of the global bus 116 it resides. The physical slot information is hardwired to each slot in the global bus 116 via HWID (hardwired identification) 272. In this manner all GMCs 150 in the GMS 112 know how many GMCs 150 are in the GMS 112. The two ISEL signals 222 define the interleave factor chosen. By knowing (1) how many GMCs 150 are in the GMS 112, (2) which slot it resides in, and (3) the interleave factor, each GMC 150 can derive which global bus addresses its subset of memory is responsible for. In other words, each GMC 150 can determine its address space.

Memory Addressing

This section describes address decoding in the GMS 112 of the present invention.

Address decoding in the GMS 112 depends on the number of GMCs 150 connected to the global bus 116. As noted above, the number of GMCs 150 connected to the global bus 116 is automatically determined at system 104 power up.

The memory banks 130 contained in the GMCs 150 are interleaved. As noted previously, the interleave factor is selectable. In this patent application, 256 bits (or 32 bytes) represents one word. Table 1 illustrates memory interleaving in the GMS 112 where four GMCs 150 are connected to the global bus 116 and the interleave factor is 8 (8 word interleave).

TABLE 1

| GMA | Least Significant Global Bus Address | Least Significant Byte Address |
|---|---|---|
| 150A | 00 through 1F | 000 through 3FF |
| 150B | 20 through 3F | 400 through 7FF |

TABLE 1-continued

| GMA | Least Significant Global Bus Address | Least Significant Byte Address |
| --- | --- | --- |
| 150C | 40 through 5F | 800 through BFF |
| 150D | 60 through 7F | C00 through FFF |

As noted above, the GMCs 150 each have four memory banks 130. According to the memory interleaving shown in Table 1, the first memory bank 130 of GMC 150A contains least significant byte addresses of 000 through 0FF. The second memory bank 130 contains least significant byte addresses of 100 through 1FF. The third memory bank 130 contains least significant byte addresses of 200 through 2FF. The fourth memory bank 130 contains least significant byte addresses of 300 through 3FF.

If one GMC 150 is in the GMS 112, then there are four memory banks 130 in the GMS 112. The four memory banks 130 are interleaved every 100 hex byte addresses. The sole GMC 150 responds to all addresses on the global bus 116 (also called global bus addresses).

If the sole GMC 150 in the GMS 112 has 128 Mbytes of memory, then the memory wraps around starting at byte address 8000000 hex. If the GMC 150 has 256 Mbytes of memory, then the memory wraps around starting at byte address 10000000 hex.

If there are two GMC 150 in the GMS 112, then there are eight memory banks 130. The eight memory banks 130 are interleaved every 100 hex byte addresses. The two GMCs 150 respond to all global bus addresses.

If the two GMCs 150 in the GMS 112 each have 256 Mbytes of memory, then the memory wraps around starting at byte address 20000000 hex.

If the two GMCs 150 in the GMS 112 each have 128 Mbytes of memory, then the memory wraps around starting at byte address 1000000 hex.

If one of the two GMCs 150 (specifically, the GMC 150 responding to the lowest global bus address) has 256 Mbytes and the other GMC 150 has 128 Mbytes, then the GMC 150 having 128 Mbytes starts wrapping around sooner than the GMC 150 having 256 Mbyte. This creates a "hole" in memory space beginning at the point where the GMC 150 having 128 Mbytes starts wrapping around.

In this case, for global bus addresses greater than 400000 hex and less than 1000000 heX, global bus addresses with least significant address bits of 20 through 3F alias to GMC 150 having 128 Mbytes.

The preferred embodiment of the present invention envisions the use of the above memory sizes. Memory cards with different memory sizes may be used for alternate embodiments of the present invention.

Global Memory Card (GMC)

The GMCs 150 are responsible for decoding addresses on the global bus 116 and responding to requests (such as memory reads and writes) addressed to its own memory address space. How a GMC 150 determines its address space is described above. If the addressed GMC 150 can respond to the current global bus cycle, then it generates an ACK (acknowledgement) as a response. If the addressed GMC 150 cannot respond (if it is saturated or locked), a NACK (negative acknowledgement) is the response. The GMCs 150 attach directly into the global bus 116. The GMCs 150 interact with the global bus 116 in four ways.

First, the GMCs 150 accept addresses and data for memory writes. As noted above, a word equals 256 bits. For memory writes, the words in memory are partitioned into eight 32 bit data slices. A memory write (also called a write cycle) writes data to one or more data slices within a word.

Specific bytes within slices may be written during memory writes. However, the GMCs 150 perform such memory writes as read-modify-write cycles. That is, the GMCs 150 read a full word from the appropriate memory bank 130. Then, the GMCs 150 modify the appropriate bytes and then write the word back to memory. The operations associated with the read-modify-write cycle are indivisible.

With each memory write, the GMCs 150 calculate and store to memory the error correction code (ECC).

Second, the GMCs 150 accept addresses for memory reads. Memory reads always return a full word to the global bus 116.

After accepting a memory read from the global bus 116, the appropriate GMC 150 reads the addressed data from the appropriate memory bank 130. Then, the GMC 150 requests the global bus 116. Once receiving the global bus 116, the GMC 150 uses the global bus 116 to return the data.

In addition to performing normal reads (that is, memory reads requiring the return of one word), the GMCs 150 also perform block reads of 2, 4 and 8 sequential words. For block reads, the memory requests contain a start address of the block read and the number of words to read. The appropriate GMCs 150 return the words requested by the block reads as they become available.

Addressing limitations apply to block reads. These addressing limitations are discussed in a section below.

The GMCs 150 check the ECC with each read. The GMCs 150 return data error status to the global bus 116 with each memory read reply, which may have been corrected if appropriate.

Third, the GMCs 150 perform memory locks (also called memory lock cycles). To support memory locking, memory reads and writes contain a lock bit as part of the globals address bus 162.

There are two memory lock modes. The lock mode is configured at power up and can only be changed by resetting the computer 104.

Lock mode 1 operates as follows: To lock a memory location, a requestor (such as a processor 120) reads the memory location with the lock bit set. The memory location is unavailable to all requestors except the requester who locked the memory location (also called the locking requestor). Specifically, the GMC 150 NACK (that is, responds with a negative acknowledgement) all memory accesses to the locked memory location that are not from the locking requestor. The GMC 150 ACK (that is, responds with an acknowledgement) all memory accesses to the locked memory location that are from the locking requestor. The locking requestor subsequently unlocks the memory location by writing to the memory location with the lock bit set. Note that the addressed GMC 150 will only ACK if it can accept a new access, but this issue is independent of lock operation. Specifically, the GMS 112 guarantees that the locking requesters will always receive ACKs when accessing their respective locked memory locations.

A time-out is maintained for each locked location. After a predetermined time as determined by its time-out, a locked location is automatically unlocked.

Lock mode 2 operates as follows. To lock a memory location, a requestor reads the memory location with the lock bit set. The appropriate GMC 150 performs an indivisible test-and-set operation by reading and returning to the requestor the data at the memory location and then setting the data in the memory location to all ones. The memory location is then immediately available to all.

Fourth, the GMCs 150 refresh their own memory. Memory refresh pulses (that is, DRAM refresh cycles to maintain data integrity) are not generated over the global bus 116.

Figure 2:
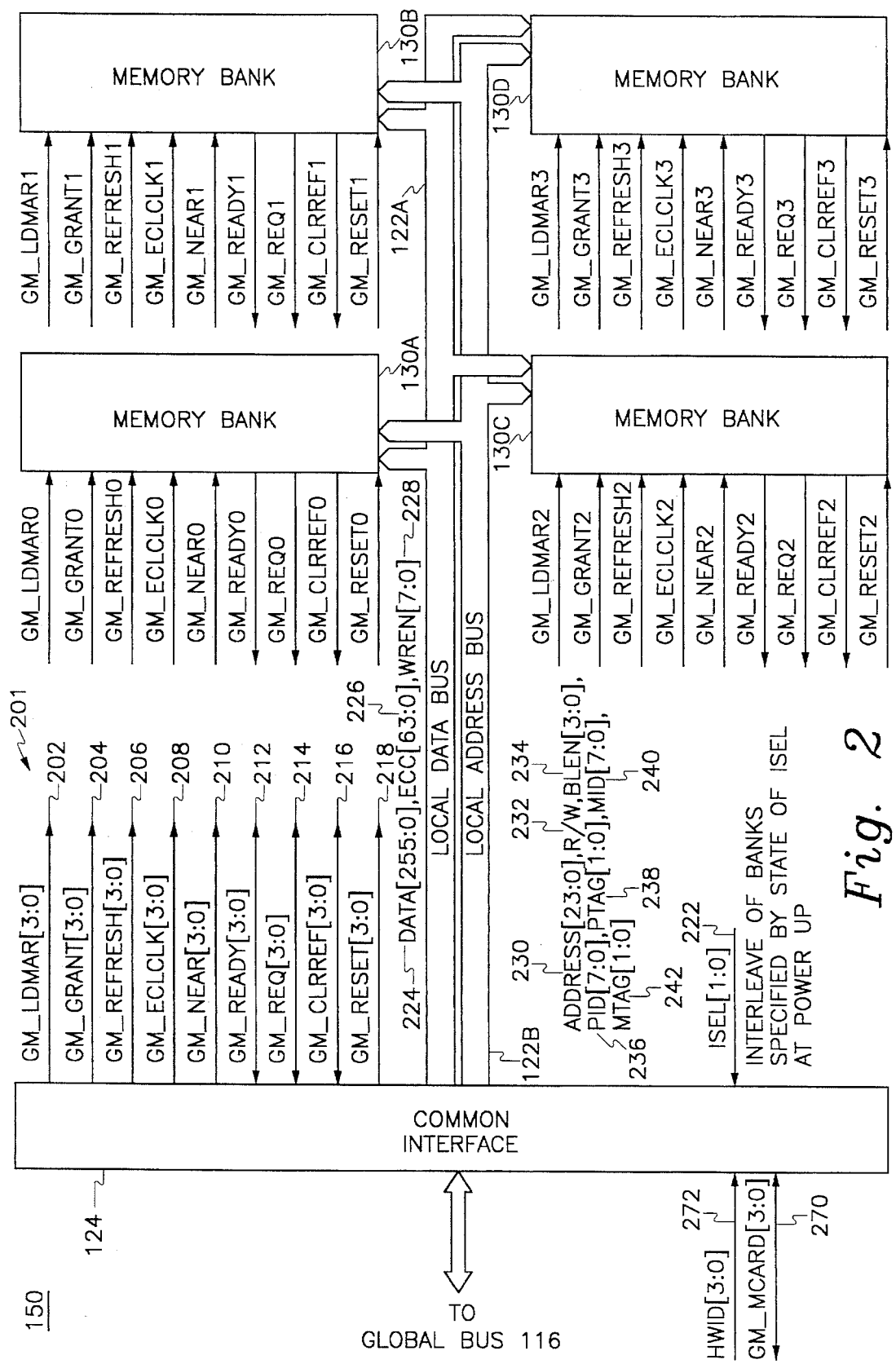
FIG. 2 illustrates a block diagram of a global memory card 150.

FIG. 2 illustrates the GMCs 150 in greater detail. For clarity, only one GMC 150 is shown in FIG. 2.

As noted above, the GMCs 150 each contain a common interface 124, four identical but independent memory banks 130, and a local bus 122 which connects the common interface 124 and the memory banks 130.

The local bus 122 contains a local data bus 122A and a local address bus 122B. The local data bus 122A contains 256 data lines 224, 64 ECC lines 226, and 8 WREN (write enable) lines 228. The local address bus 122B contains 24 address lines 230, a R/W (read/write) line 232, 4 BLEN (block length) lines 234, 8 PID (processor identification) lines 236, 2 PTAG (processor tag) lines 238, 8 MID (memory identification) lines 240, and 2 MTAG (memory tag) lines 242 (the MID 240 and MTAG 242 are returned along with read replies). The general definition and operation of the above lines of the local bus 122 are well known. Thus, for brevity, the above lines of the local bus 122 are discussed herein to the extent necessary to sufficiently describe the structure and operation of the present invention.

The common interface 124 and the memory banks 130 are described in the following sections.

Common Interface

As shown in FIG. 2, the common interface 124 interacts with the memory banks 130 over the local bus 122. The common interface 124 also interacts with the memory banks 130 over a number of control lines 201.

The control lines 201 include 4 GM_LDMAR (global memory load memory address register) lines 202, 4 GM_GRANT (global memory grant) lines 204, 4 GM_REFRESH (global memory refresh) lines 206, 4 GM_ECLCLK (global memory error correction logic clock) lines 208, 4 GM_NEAR (global memory near) lines 210, 4 GM_READY (global memory ready) lines 212, 4 GM_REQ (global memory request) lines 214, 4 GM_CLRREF (global memory clear refresh) lines 216, and 4 GM_RESET (global memory reset) lines 218. The control lines 201 are symmetrically connected to the memory banks 130. For example, the GM_LDMAR lines 202 include GM_LDMAR0, GM_LDMAR1, GM_LDMAR2, and GM_LDMAR3, which are connected to memory bank 130A, memory bank 130B, memory bank 130C, and memory bank 130D, respectively.

The general definition and operation of the control lines 201 are well known. Thus, for brevity, the control lines 201 are discussed herein to the extent necessary to sufficiently describe the structure and operation of the present invention.

The common interface 124 performs the following functions.

First, the common interface 124 decodes addresses on the global bus 116. If an address on the global bus 116 is addressed to the common interface 124 (that is, if the common interface's 124 GMC 150 responds to the address on the global bus 116), and if the common interface 124 is ready to process a memory access, then the common interface 124 generates an ACK on the global bus 116. If the common interface 124 is not ready, or if the address on the global bus 116 pertains to a locked memory location, then the common interface 124 generates a NACK on the global bus 116.

If the address on the global bus 116 is not addressed to the common interface 124, then the common interface 124 does nothing.

The ACYCLE line 164 on the global bus 116 is asserted for 1 clock cycle in order to specify an address cycle on the global bus 116. On the same clock cycle the GMCs 150 latch in address information from the address lines 162 of the global bus 116.

The address information includes a processor ID field (PID) 236, a processor tag field (PTAG) 238, a block length field (BLEN) 234, a read-modify-write field (RMW), a read/write (R/W) field, address parity (described above) and a lock field.

RMW (read-modify-write) specifies whether the GMC 150 must perform a read-modify-write operation, that is, a write to less than a full data slice. Recall that 1 word is 256 bits, partitioned into eight 32 bit slices.

If the address cycle relates to a memory read, then the GMC 150 returns the PID 236 and PTAG 238, in the form of a memory identification (MID) 240 and memory tag (MTAG) 242, with the return data in order to identify the return data.

BLEN 234 specifies the number of words to read during block reads. The number of words to read equals 2 to the nth power, where BLEN 234 specifies n. If n is zero, then the memory read is called a random read. If n is not zero, then the memory read is a block read.

If the address cycle relates to a memory write, then PID 236, PTAG 238, and BLEN 234 are ignored in subsequent processing. The GMCs 150 latch in data information on the data lines 160 of the global bus 116 during the cycle following the address cycle (that is, two cycles after ACYCLE 164 is asserted).

The data information includes a data word (having 32 bytes), data parity (described above), and a 32-bit byte enable field (BEN). A one-to-one correspondence exists between the bits in the BEN and the bytes in the data word. The BEN indicates which bytes in the data word to write to memory.

Second, the common interface 124 buffers (that is, stores) memory accesses (that is, memory reads and writes) from the global bus 116. In a preferred embodiment of the present invention, the common interface 124 buffers up to eight words and their addresses per memory bank 130 for writing and up to eight words and their appropriate MID and MTAGS per memory bank 130 for replying to memory reads.

Third, the common interface 124 requests and utilizes the global bus 116 for read replies. Specifically, the common interface 124 asserts the GM_REQ 214 in order to request the global bus 116 when it has read data to return.

The common interface 124 then waits for the global arbiter 168 to assert the GM_GRANT 204. Once the GM_GRANT 204 is asserted, the common interface 124 drives data 224, data parity, MID 240, and MTAG 242 to the global bus 116 for one clock cycle. During this time the common interface 124 asserts the DCYCLE 164 on the global bus 116. Requestors accept the data 224, data parity, MID 240, and MTAG 242 while DCYCLE 164 is asserted.

Fourth, the common interface 124 schedules memory accesses to the memory banks 130. As shown in FIG. 2, access by the common interface 124 to the memory banks 130 is controlled via GM_READY 212, GM_LDMAR 202, GM_REQ 214, and GM_GRANT 204.

To schedule a memory access to one of its four memory banks 130 the common interface 124 decodes the latched global bus address to decide which of the four memory banks 130 the memory access is for. For illustrative purposes, suppose the memory access is for the memory bank 130A.

If the memory bank 130A is asserting GM_READY0, then the common interface 124 asserts GM_LDMAR0 for one clock cycle. Address information 230, 232, 234, 236, 238, 240, 242 is valid on the local address bus 122B for the clock cycle following GM_LDMAR0 and write information 224, 226, 228 is valid during the second clock cycle following GM_LDMAR0. During the second clock cycle following GM_LDMAR0, the common interface 124 forms the WREN 228 by logically ANDing the BEN from the global bus 116 for a 32 bit slice. The WREN 228 enables or disables a write to that 32 bit slice of memory when the memory bank 130A performs the memory write.

If RMW on the global bus 116 is asserted then the common interface 124 performs a read-modify-write cycle. During the read-modify-write cycle the common interface 124 performs a read from the memory bank 130A. Then the common interface 124 merges in the appropriate bytes and the resulting data is written back to the memory bank 130A with a write cycle.

If the cycle is a read, then there is no data cycle associated with LDMAR0.

The memory bank 130A deasserts its GM_READY0 to allow it time to perform a memory access. The memory bank 130A asserts its GM_READY0 when it can accept a new address cycle. In a preferred embodiment of the present invention, the memory banks 130 can each accept sustained memory accesses every 8 clock cycles. Thus, at 40 MHz, the maximum data bandwidth per second per memory bank 130 is 160 Mbytes per second. With four memory banks 130 operating, the aggregate maximum bandwidth of each GMC 150 at 40 MHz is 640 Mbytes per second (for sustained non-page mode writes and reads). Theoretically, this is one half of the bandwidth of the local bus 122. Due to implementation constraints, however, the local bus 122 saturates when scheduling read or write cycles at slightly greater than 426 Mbytes per second.

If the memory access is a read, then the memory bank 130A requests the local bus 122 by asserting its GM_REQ0. Traffic on the local bus 122 is controlled by a local bus arbitrator (not shown in FIG. 2) located in the common interface 124. The common interface 124 asserts the GM_GRANT0 to give the memory bank 130A the local bus 122.

The memory bank 130A drives valid data 224, 226 on the local data bus 122A while GM_GRANT0 is asserted.

Fifth, the common interface 124 schedules refresh cycles to the memory banks 130. The memory banks 130 arbitrate between refresh cycles and memory access cycles when there is a potential conflict.

A refresh scheduler (not shown in FIG. 2) contained in the common interface 124 is used to schedule refresh cycles to each memory bank 130. The refresh scheduler holds the GM_REFRESH 206 for a memory bank 130 low until the memory bank 130 has time to perform the refresh cycle. Once the memory bank 130 completes the refresh cycle, the memory bank 130 asserts its GM_CLRREF0 (that is, clear refresh).

Sixth, the common interface 124 calculates the ECC 226 when performing writes to the memory banks 130.

Seventh, the common interface 124 checks the ECC 226 when accepting read replies from the memory banks 130. The common interface 124 corrects single bit errors before returning data to the global bus 116. The common interface 124 returns double bit errors to the global bus 116 unaltered.

Eighth, the common interface 124 allows for the physical interconnection of the GMC 150 to the global bus 116. The common interface 124 also performs any necessary level translation and clock deskewing.

Memory Banks

The GMCs 150 each include four independent memory banks 130. The memory banks 130 receive input from the local bus 122. The memory banks 130 also provide output to the local bus 122. Table 2 lists these inputs. Table 3 lists these outputs. Specific frequency, times (in nanoseconds), and voltage values (in volts) are provided for illustrative purposes. Vil and Vol values are maximum, Vih and Voh are minimum.

TABLE 2

| INPUT | DESCRIPTION |
| --- | --- |
| GM_ECLCLK(1:0) 208 | Differential ECL clock pair. Two per memory bank 130. Nominal frequency is 40 MHz, 60-40 mimimum duty cycle. Vil = −1.475; Vih = −1.165 at nominal frequency. |
| GM_RESET 218 | Asserted low reset signla. Vil = 0.7; Vih = 2.0; Tsetup = 13.5; Thold = 0. |
| GM_LDMAR 202 | Asserted low address latch enable. Vil 0.7; Vih = 2.0; Tsetup = 7.0; Thold = 0. |
| GM_NEAR 210 | Asserted low next row address near. Vil = 0.7; Vih = 2.0; Tsetup = 7.0: Thold = 0. |
| GM_BLEN(3:0) 234 | Block read length bits. Vil = 0.7; Vih = 2.0; Tsetup = 7.0; Thold = 0. |
| GM_PTAG(1:0) 238 | Tag bits. Vil = 0.7; Vih = 2.0; Tsetup = 6.5; Thold = 5.5. |
| GM_PID(7:0) | Processor ID bits. Vil = 0.7; Vih = 2.0; Tsetup = 6.5; Thold = 5.5. |
| GM_GRANT 204 | Local bus grant for read reply cycle. Vil = 0.7; Vih = 2.0; Tsetup = 13.0; Thold = 0. |
| GM_WREN(7:0) 228 | Slice write enable bits. Vil = 0.7; Vih = 2.0; Tsetup = 6.5; Thold = 5.5 |
| GM_D(255:0) 224 | Data bits. Vil = 0.7; Vih = 2.0; Tsetup = 6.5; Thold = 5.5 |
| GM_E(63:0) 226 | ECC bits, eight per slice. Vil = 0.7; Vih = 2.0; Tsetup = 6.5; Thold = 5.5. |
| GH_REFRESH 206 | Asserted low refresh signal. Vil = 0.7; Vih = 2.0; Tsetup = 7.0; Thold = 0. |
| GM_ADDR(23:0) 230 | Address bits. Vil = 0l7; Vih = 2.0; Tsetup = 7.0; Thold = 0. |
| GM_R/W 232 | Data direction bit. High means read cycle. Vil = 0.7; Vih = 2.0; Tsetup = |

TABLE 2-continued

| INPUT | DESCRIPTION |
|---|---|
| | 7.0; Thold = 0. |

TABLE 3

| OUTPUT | DESCRIPTION |
|---|---|
| GM_MID(7:0) 240 | Read reply ID bits. Vol = 0.3; Voh = 2.4; Tsetup = 25.0; Thold = 2.0; Tzo = 13.0; Toz = 13.0. |
| GM_MTAG(1:0) 242 | Read reply tag bits. Vol = 0.3; Voh = 2.4; Tsetup = 25.0; Thold = 2.0; Tzo = 13.0; Toz = 13.0. |
| GM_D(255:0) 224 | Read reply data bits. Vol = 0.3; Voh = 2.4; Tsetup = 25.0; Thold = 2.0; Tzo = 13.0; Toz = 13.0. |
| GM_E(63:0) 226 | Read reply ECC bits. Vol = 0.3; Voh = 2.4; Tsetup = 25.0; Thold = 2.0; Tzo = 13.0; Toz = 13.0. |
| GM_REQ 214 | Asserted low request local bus for read reply cycle. Vol = 0.3; Voh = 2.4; Tsetup = 15.0; Thold = 3.0. |
| GM_READY 212 | Asserted low bank ready. Vol = 0.3; Voh = 2.4; Tsetup = 15.0; Thold = 3.0. |
| GM_CLRREF 216 | Asserted low clear refresh signal. Vol = 0.3; Voh = 2.4; Tsetup = 15.0; Thold = 3.0. |

The memory banks 130 are scheduled independently as described above for memory access cycles and memory refresh cycles. The memory banks 130 compete with each other and the common interface 124 for the local bus 122.

Figure 3A:
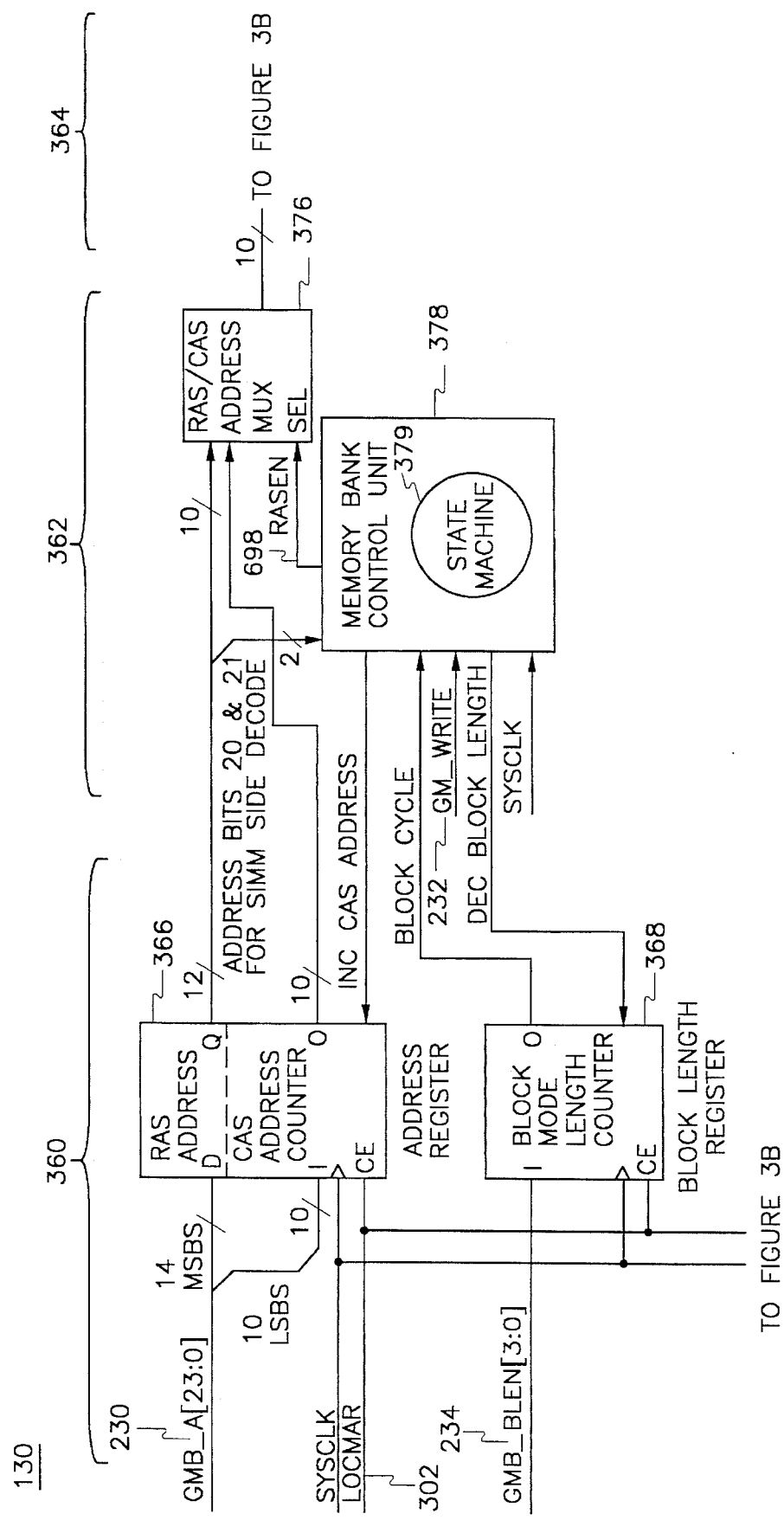
FIGS. 3A and 3B collectively illustrate a block diagram of a memory bank 130.
Figure 3B:
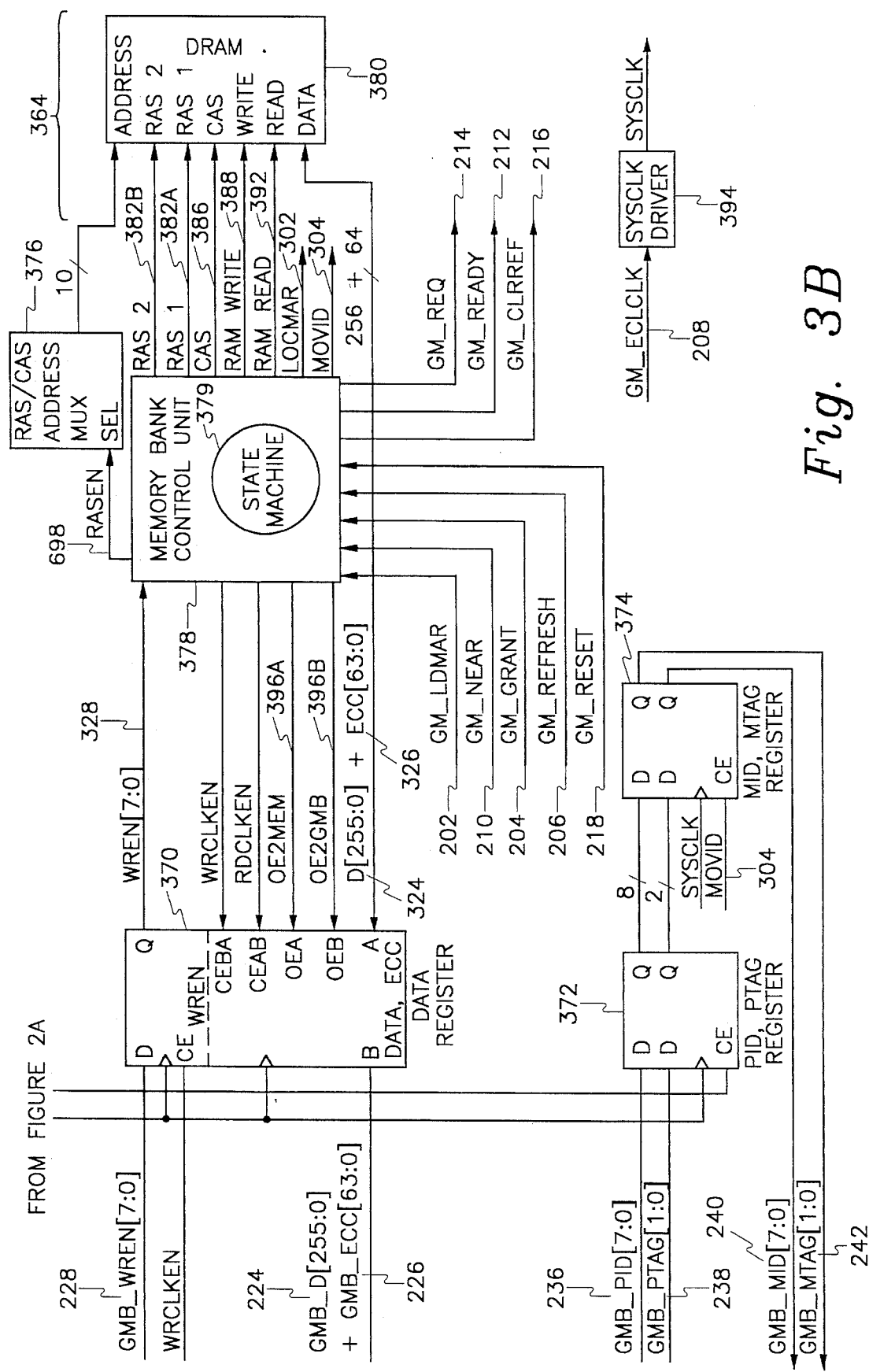

FIGS. 3A and 3B collectively illustrate a block diagram of the memory banks 130. For clarity, the memory bank control unit 378 and the RAS/CAS row address signal/column address signal address multiplexer 376 are shown in both FIGS. 3A and 3B. Note that only one memory bank 130 is shown in FIGS. 3A and 3B.

The memory banks 130 each include a register section 360, a control section 362, and a DRAM section 364.

The register section 360 contains registers 366, 368, 370, 372, 376, 394 which interface the memory bank 130 to the local bus 122. The registers 366, 368, 370, 372, 376, 394 latch data and addresses from the local bus 122 and drive data to the local bus 122.

The control section 362 contains a memory bank control unit (CU) 378. The CU contains a state machine 379 and redrivers that control the register section 360 and the DRAM section 364.

The DRAM section 364 contains dynamic random access memory 380.

As shown in FIGS. 3A and 3B, a number of signals exist between the local bus 122, register section 360, control section 362, and DRAM section 364. The general definition and operation of these signals are well known. Thus, for brevity, these signals are discussed herein to the extent necessary to sufficiently describe the structure and operation of the present invention.

The operation of the memory bank 130 will now be described.

The CU 378 asserts GM_READY 212 when the memory bank 130 can accept a memory cycle. This first happens following the assertion of GM_RESET 218. The CU 378 deasserts GM_READY 212 when the common interface 124 asserts the GM_LDMAR 202 for one cycle. GM_LD-MAR 202 indicates an address cycle. During the address cycle, an address register 366 latches in an address 230 on the local address bus 122B. The CU 378 reasserts GM_READY 212 after the address 230 in the address register 366 is no longer needed to access the DRAM 380 (that is, after the associated memory access is complete).

One clock after GM_LDMAR 202 is asserted, the CU 378 asserts LOCMAR 302 (thus, LOCMAR 302 is a one clock-delayed copy of GM_LDMAR 202). LOCMAR 302 is used by the CU 378 to schedule memory cycles with the DRAM 380. LOCMAR 302 is also used as a clock enable for the address register 366.

For memory writes, write information (that is, data 224, ECC 226, and WREN 228) is latched into a data register 370 one clock after LOCMAR 302 is asserted. The data register 370 is a bidirectional registered transceiver so that a write cycle can occur if a read reply is pending from the memory bank 130 without corrupting the read reply data.

If there is not a read reply cycle pending, then the CU 378 asserts MOVID 304 in order to transfer PID 236 and PTAG 238 from a PID/PTAG register 372 into a MID/MTAG register 374 (PID 236 and PTAG 238 were earlier latched into the PID/PTAG register 372 from the local address bus 122B). While in the MID/MTAG register 374, PID 236 and PTAG 238 are call MID 240 and MTAG 242, respectively.

If the cycle is a read, then MID 240 and MTAG 242 are retained and returned subsequently with data 244 and ECC 226. If the cycle is a write, then MID 240 and MTAG 242 are overwritten by the next memory cycle.

If a read reply cycle is pending, then the CU 378 does not assert MOVID 304. Thus, PID 236 and PTAG 238 remain in the PID/PTAG register 372 until the read reply cycle. During the read reply cycle, PID 236 and PTAG 238 are transferred to the MID/MTAG register 374. Note that any number of write cycles may occur while a read reply is pending. If a read reply is pending and a new memory read is scheduled, then the CU 378 does not assert GM_READY 212 until the reply cycle for the pending read reply takes place. The reply cycle empties the MID/MTAG register 374 and the data register 370 for the next read.

The CU 378 asserts GM_REQ 214 to request the local bus 122 for a read reply. Specifically, GM_REQ 214 is asserted one clock before new data 324 is latched into the data register 370 because this is the minimum time that will elapse before the common interface 124 asserts GM_GRANT 204 to the CU 378.

The common interface 124 holds GM_GRANT 204 low for two clock cycles. The CU 378 deasserts GM_REQ 214 as soon as GM_GRANT 204 is seen active.

The memory bank 130 is required to drive valid read reply data (that is, data 224, ECC 226, MID 240, and MTAG 242) from the data register 370 to the local bus 122 as soon as possible after GM_GRANT 204 goes low and for the entire next clock cycle. This is done so that data set up time to the common interface 124 may be a minimum of one clock cycle.

Then, the memory bank 130 is required to tristate its data register 370 as soon as possible after the second clock edge of the GM_GRANT 204, even though GM_GRANT 204 may still be seen as active by the bank 130. This allows a new read reply cycle to be scheduled to a different memory bank 130 without waiting one clock for the local bus 122 to return to tristate.

Since propagation delays of signals on the local bus 122 are approximately one half of a clock cycle, the data register 370 during read reply operations must turn on for one clock cycle after asynchronously sampling GM_GRANT 204, and then synchronously turn off after the following clock edge of GM_GRANT 204.

In addition, the data register 370 contains 40 registers (each having 8 bits) that are not centralized on the board containing the GMC 150. Thus, data register output enables 396 must drive the 40 registers very quickly without significantly loading the GM_GRANT 204. To place a large load on GM_GRANT 204 (or any other local bus signal) would cause GM_GRANT 204 to be skewed significantly with respect to the system clock (that is, SYSCLK). In addition, the data register 370 must have fast turn on and turn off times.

According to a preferred embodiment of the present invention, the GMC 150 is implemented in the following manner in order to satisfy the requirements described above.

GM_REQ 214 is fed into a non-inverting high current driver (such as 74FCT244A). The output of the non-inverting high current driver is called BREQ 414 and is local to the memory bank 130.

BREQ 414 is fed into the inputs of an eight bit register with eight outputs and an output enable (such as 74F374). The eight outputs of the eight bit register represent output enables for the 40 registers contained in the data register 370. Each of the eight output enables has eight to ten distributed loads and are terminated with a bias voltage of 3 volts at approximately 100 Ohms to ground.

GM_GRANT 204 is fed into the output enable of the eight bit register. When CU 378 asserts GM_REQ 214 to request the local bus 122 the inputs (that is, BREQ 414) to the eight bit register go low but the eight bit register remains tristate, since its output enable (that is, GM_GRANT 204) is high. The terminators keep the outputs of the eight bit register at a high logic level. Thus, the data register 370 is tristated.

When the common interface 124 pulls GM_GRANT 204 low, the eight bit register turns on and the data register 370 is enabled and drives the local bus 122 (after a turn-on time of the eight bit register plus board propagation delay plus data register 370 turn on time).

Signal integrity of the output enables from the eight bit register is maintained by the 100 Ohm terminators, which are fairly close to the printed circuit board (PCB) impedance.

GM_REQ 214 is pulled high on the clock following GM_GRANT 204 thereby pulling BREQ 414 high. On the following clock the output enables are pulled high by the eight bit register. The output enables go tristate whenever GM_GRANT 204 goes high again, settling at 3 volts. This allows data to be tristated on the local bus 122 one eight-bit register propagation delay plus one board propagation delay plus one data register 370 turn off time after the rising clock edge. Data turn on time and turn off time are minimized with a minimal loading of the GM_REQ 214 signal and GM_GRANT 204 signal.

Memory Bank Operation

As noted above, the CU 362 contains a state machine 379 that controls the register section 360 and the DRAM section 364.

The operation of the memory banks 130 is further described in this section with reference to FIGS. 4 through 8, which illustrate aspects of the operation of the state machine 379. While the entire operation of the state machine 379 is not described in this section, those with skill in the art will find it obvious to implement the entire state machine 379 of the present invention based on the discussion described herein.

In FIGS. 4 through 8, "!" represents logical NOT, "&" represents logical AND, and "#" represents logical OR.

The manner in which the CU 362 generates GM_READY 212 and GM_REQ 214 is described below with reference to FIGS. 4 and 5B, respectively.

Figure 4:
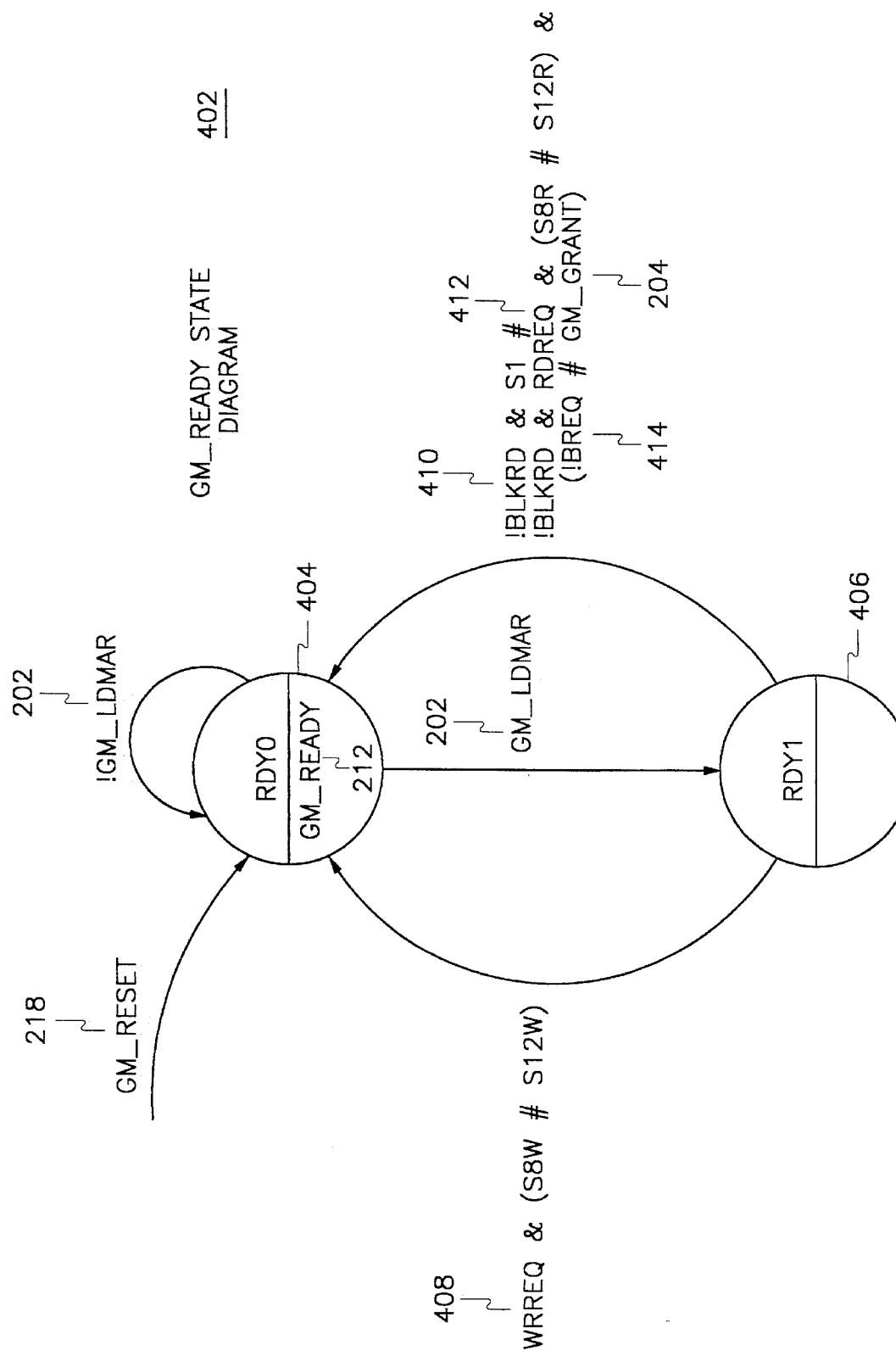
FIG. 4 illustrates a GM_READY (global memory ready) state diagram 402 of a state machine 379.
Figure 5:
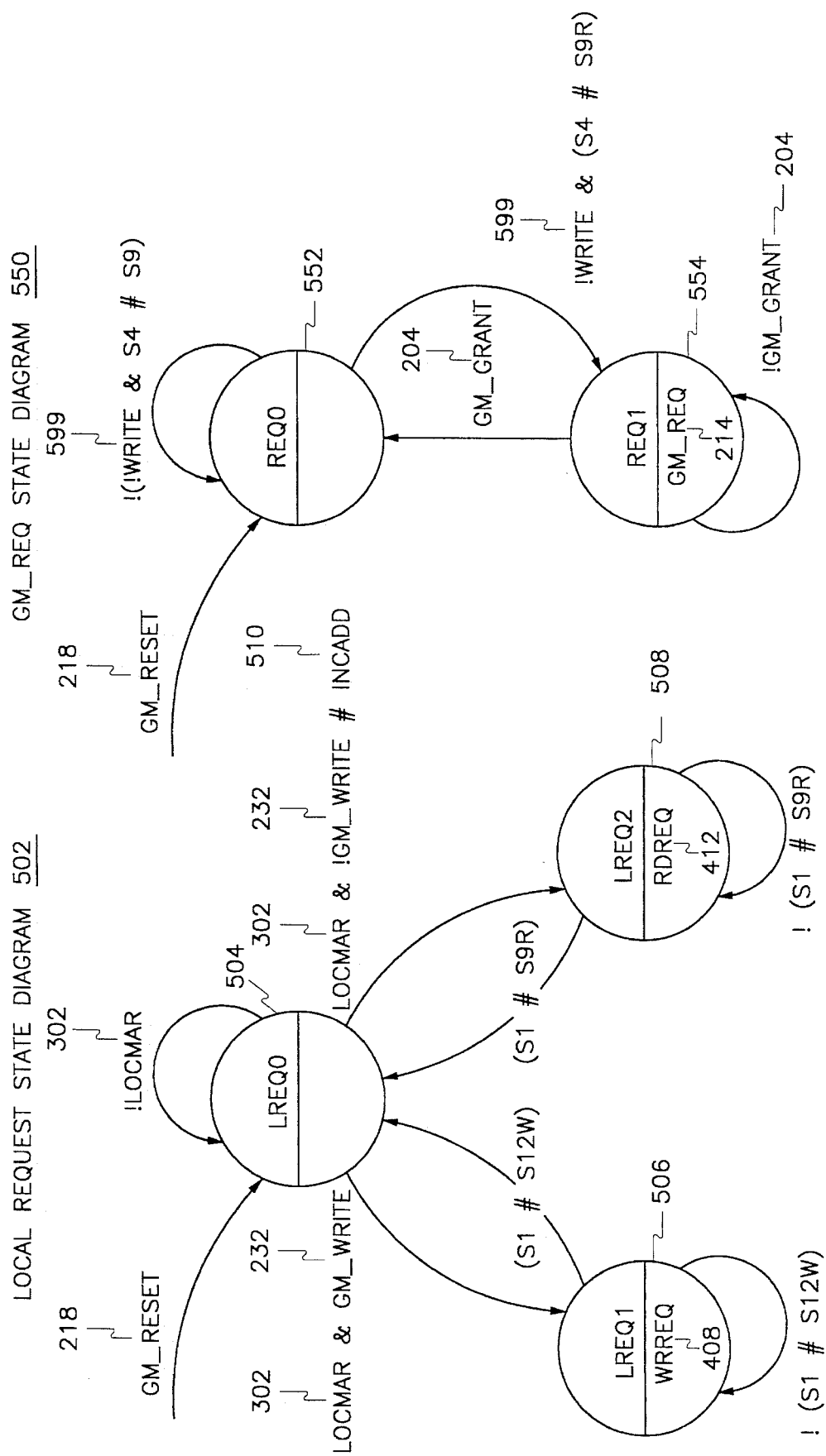
FIG. 5A illustrates a local request state diagram 502 of the state machine 379.
FIG. 5B illustrates a GM_REQ (global memory request) state diagram 550 of the state machine 379.

FIG. 4 illustrates a GM_READY state diagram 402 of the state machine 379. According to the GM_READY state diagram 402, the CU 378 enters a RDY0 state 404 when GM_RESET 218 is asserted by the common interface 124. While in the RDY0 state 404, the CU 378 asserts GM_READY 212. The CU 378 stays in the RDY0 state 404 while GM_LDMAR 202 is not asserted.

When the common interface 124 asserts GM_LDMAR 202, the CU 378 enters the RDY1 state 406. While in the RDY1 state 406, the CU 378 deasserts GM_READY 212.

The CU 378 stays in the RDY1 state 406 until either (1) WRREQ 408 (that is, write request) is asserted while in either a state SSW or S12W, (2) BLKRD 410 (that is, block read) is not asserted while in a state S1, or (3) BLKRD 410 is not asserted and RDREQ 412 (that is, read request) is asserted while in state SSR or S12R and either BREQ 414 is not asserted or GM GRANT 204 is asserted.

FIG. 5B illustrates a GM_REQ state diagram 550 of the state machine 379. According to the GM_REQ state diagram 550, the CU 378 enters a REQ0 state 552 when GM_RESET 218 is asserted by the common interface 124. While in the REQ0 state 552, the CU 378 deasserts GM_REQ 214.

When WRITE 599 (which is the latched in version of GM_WRITE 232 when LOCMAR 302 is active) is not asserted while in either state S4 or S9R, the CU 378 enters the REQ1 state 554. While in the REQ1 state 554, the CU 378 asserts GM_REQ 214. The CU 378 stays in the REQ1 state 554 until the common interface 124 asserts GM_GRANT 204, whereby the CU 378 returns to the REQ0 state 552.

As evident from the above discussion, the CU 378 generates certain signals that are used solely by the state machine 379 of the present invention. That is, these signals are not propagated outside of the CU 378. WRREQ 408 and RDREQ 412 represent two of these signals. The manner in which the CU 378 generates WRREQ 408 and RDREQ 412 is described below with reference to FIG. 5A.

FIG. 5A illustrates a local request state diagram 502 of the state machine 379. According to the local request state diagram 502, the CU 378 enters a LREQ0 state 504 when the common interface 124 asserts GM_RESET 218. The CU 378 stays in the LREQ0 state 504 while LOCMAR 302 is not asserted.

When LOCMAR 302 and GM_WRITE 232 (also called R/W 232) are asserted, then the CU 378 enters LREQ1 state 506. While in LREQ1 state 506, the CU 378 generates WRREQ 408.

When LOCMAR 302 is asserted and GM_WRITE 232 (also called R/W 232) is not asserted, or if INCADD 510 (that is, an increment address signal which is used by the CU 378 to schedule and process block read operations) is asserted, then the CU 378 enters LREQ2 state 508. While in LREQ2 state 508, the CU 378 generates RDREQ 412.

Figure 6:
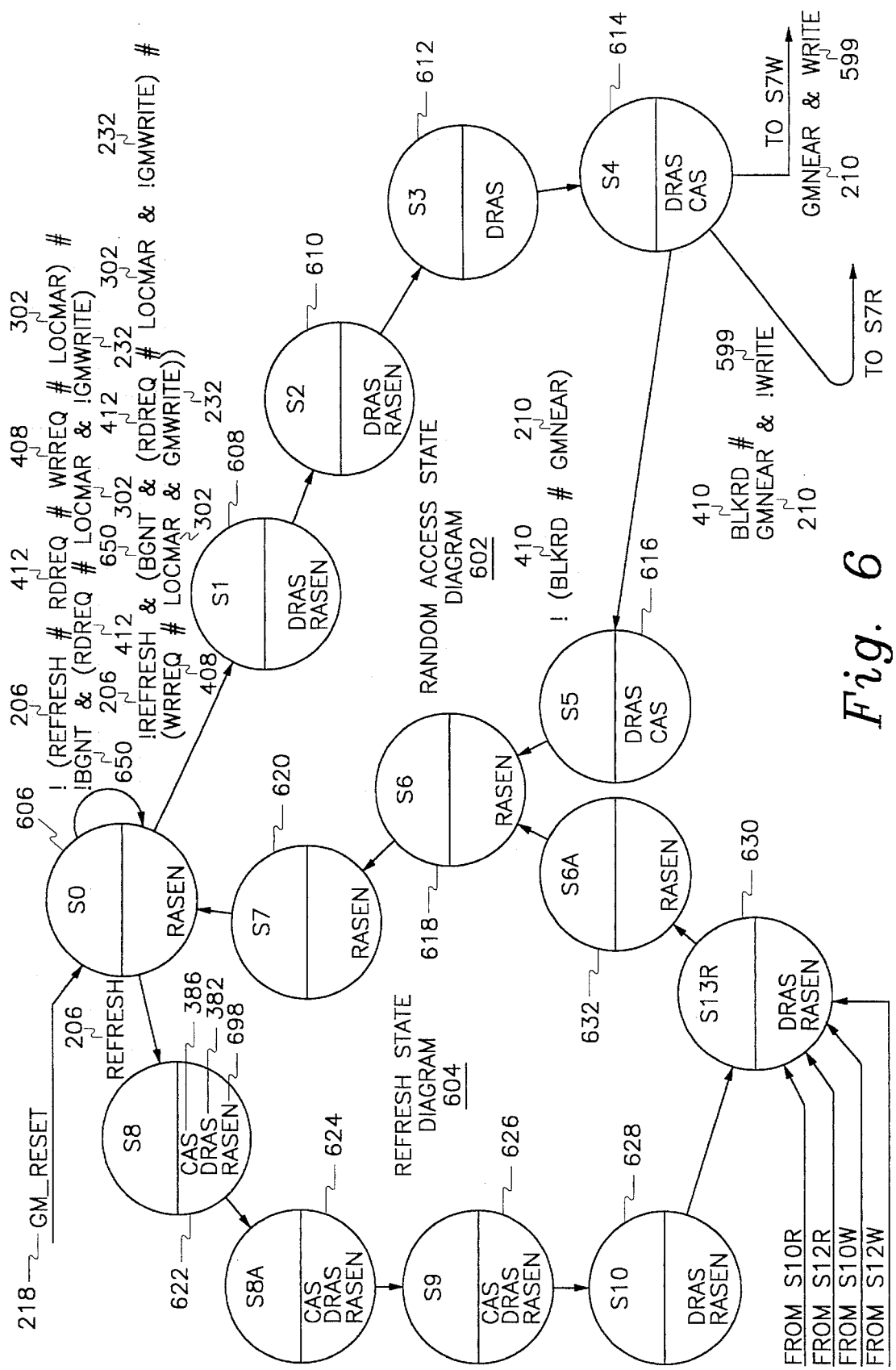
FIG. 6 illustrates a random access state diagram 602 and a refresh state diagram 604 of the state machine 379.
Figure 7:
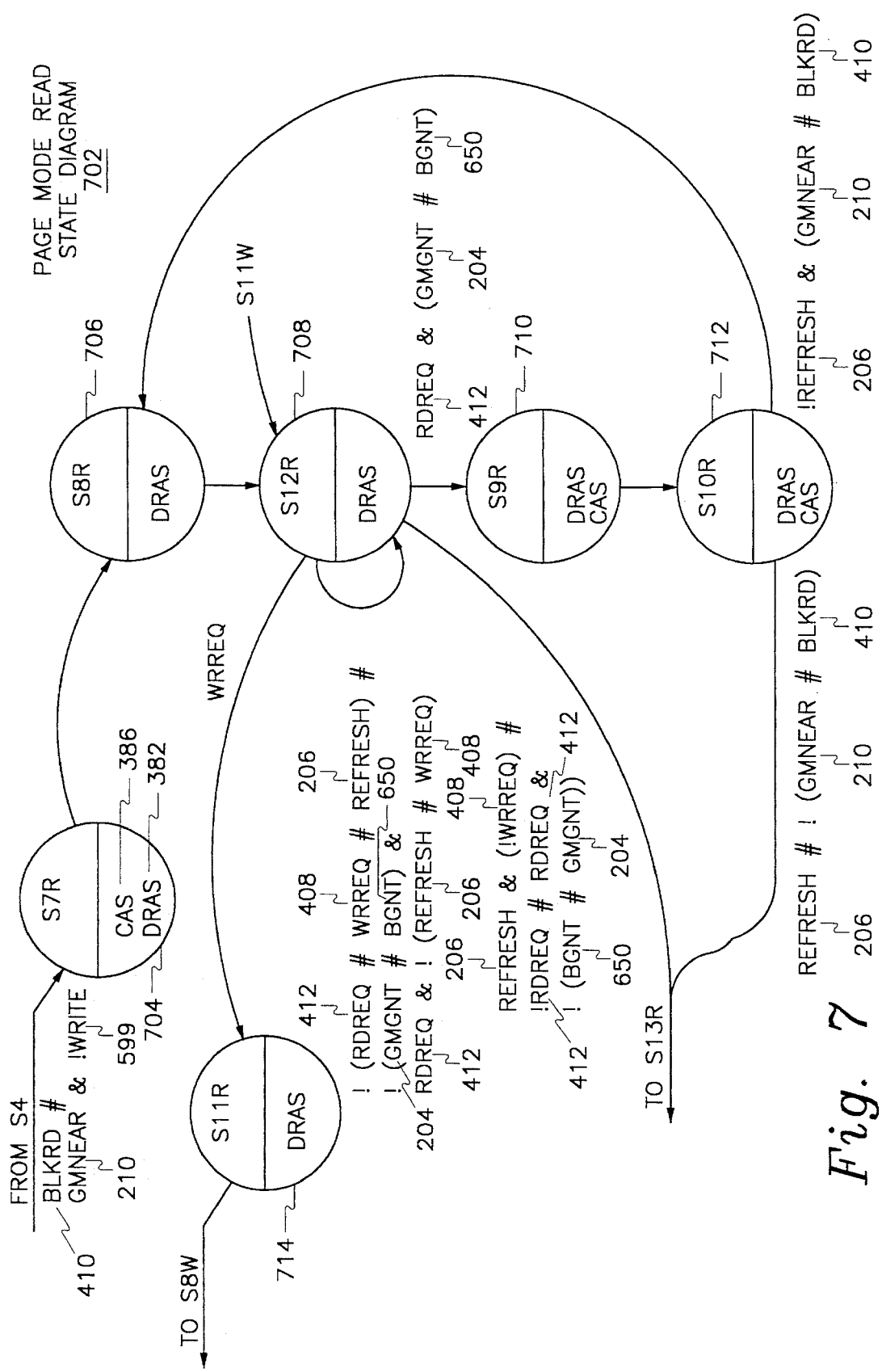
FIG. 7 illustrates a page mode read state diagram 702 of the state machine 379.
Figure 8:
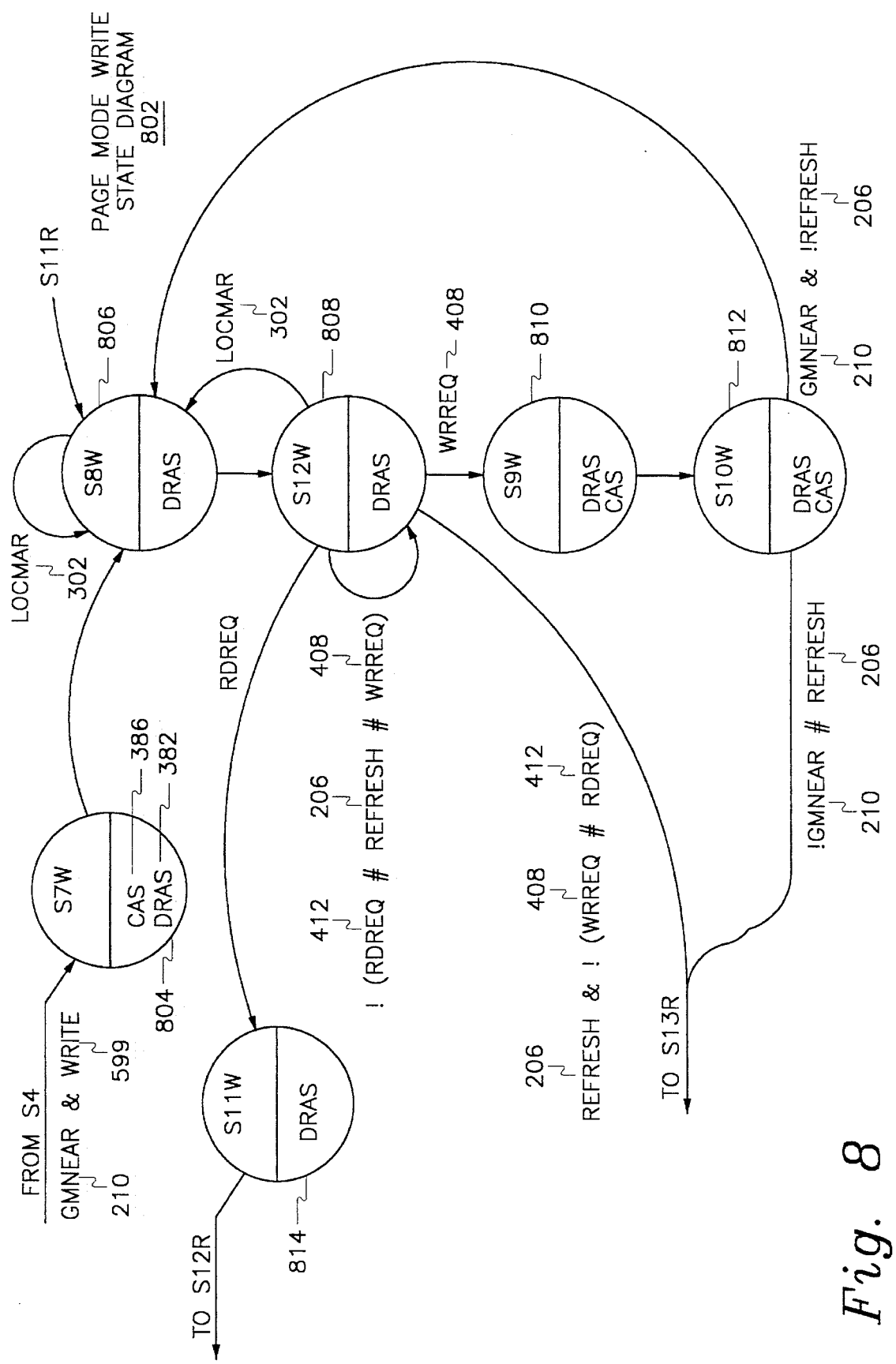
FIG. 8 illustrates a page mode write state diagram 802 of the state machine 379.

FIGS. 6, 7, and 8 illustrate the manner in which the CU 378 performs memory read, write, and refresh operations. Specifically, FIG. 6 illustrates a random access state diagram (also called a random access or memory access cycle) 602 and a refresh state diagram (also called a refresh cycle) 604 of the state machine 379. FIG. 7 illustrates a page mode read state diagram (also called a page mode read cycle) 702 of the state machine 379. FIG. 8 illustrates a page mode write state diagram (also called a page mode write cycle) 802 of the state machine 379.

In a preferred embodiment of the present invention, fast access page mode DRAM 380 are used in order to minimize the effect of RAS (row address signal) precharge time upon memory cycles. Page mode is used in three ways: block cycles, near read cycles and near write cycles. The GMC 150 uses CAS (column address signal) before RAS refresh. Thus, a refresh address counter is not required.

Referring first to FIG. 6, the CU 378 enters S0 606 when the common interface 124 asserts GM RESET 218. While in S0 606, refresh cycles 604 take priority over memory access cycles 602.

The CU 378 moves from S0 606 to S1 608 (memory access cycles start at S1 608) when LOCMAR 302 is asserted or a write request or read request is pending (that is, WRREQ 408 or RDREQ 412 is asserted). When LOCMAR 302 is asserted the CU 378 determines whether the operation is a memory read or write by looking at GM_WRITE 232, which represents the unbuffered local bus R/W signal 232.

If a memory read is to be performed (that is, LOCMAR 302 is asserted and GM_WRITE 232 is unasserted or RDREQ 412 is asserted), then the CU 378 proceeds to S1 608 only if a read reply cycle is not pending. The CU 378 determines whether a read reply cycle is pending by looking at BGNT 650 (that is, a bus grant signal which the CU 378 asserts when it receives control of the local bus 122). If BGNT 650 is asserted, then a read reply cycle is not pending. That BGNT 650 is asserted indicates that the CU 378 is not waiting for GM_GRANT 204 to be asserted. The CU 378 deasserts BGNT 650 during the same cycle that the CU 378 asserts GM_REQ 214. BGNT 650 is not asserted until GM_GRANT 204 is asserted for the read reply cycle.

If a memory write is to be performed (that is, LOCMAR 302 and GM_WRITE 232 are asserted), then the CU 378 proceeds to S1 608 unconditionally.

If a memory write is to be performed, then the data register 370 is enabled to drive data to the DRAM 380 following S1 608. Also, RAM_WRITE 388 is asserted to the DRAM 380 on the following cycle. Note that write data is latched into the data register 370 on the cycle following LOCMAR 302 (that is, the assertion of LOCMAR 302) if a memory write operation is specified by GM_WRITE 232 being asserted.

In a preferred embodiment of the present invention, the DRAM 380 is configured on single in line memory modules (SIMMs) containing 1 or 2 MBytes. Each SIMM is a slice of the 256 bit data word, each slice containing 32 data bits and 8 ECC bits. As noted above, a word contains 32 bytes (or equivalently, 8 slices). During memory writes, a 32-bit BEN is associated with the word to be written, wherein a one-to-one correspondence exists between the bits in the BEN and the bytes in the word. Specifically, a bit in the BEN is enabled if the corresponding byte in the word is to be written to the DRAM 380.

GMB_WREN 228 contains 8 write enables. For a write operation involving a particular word, the write enables correspond to the slices in the word. A write enable for a slice is formed by logically ANDing the 4 bits in the BEN corresponding to the bytes in the slice. The common interface 124 does this; the memory bank 130 is only cognizant of GMB_WREN 228. WREN 328 is the latched version of GMB_WREN 228.

Memory writes have a granularity of one slice. During memory writes, slices are written to the DRAM 380 if the corresponding write enables in the WREN 328 are asserted. RAM_WRITE 388 is asserted to the DRAM 380 at the appropriate point in the write cycle. Read-modify-write operations are performed in order to write individual bytes, as previously described.

If a memory read is to be performed, then WREN 328 is ignored and the CU 378 asserts RAM_READ 392 on a cycle following S3 612. During S1 608, S2 610, and S3 612, the data register 370 is enabled and RAS 382A, 382B and RASEN 698 (that is, a row address signal enable which is asserted to an address multiplexer 376 in order to send a row address to the DRAM 380) are asserted. The DRAM 380 read or write signal (that is, RAM_READ 392 or RAM_WRITE 388, respectively) is also asserted based upon the state of WRITE 599 and WREN 228.

The CU 378 asserts CAS 386 to the DRAM 380 during S4 614 and S5 616. As noted previously, the DRAM 380 is configured on SIMMs that are either one megabyte or two megabytes deep. Each megabyte is called a side. Bit 20 of the address 230 on the local address bus 122B specifies the side which is accessed.

Specifically, at S1 608 the CU 378 asserts DRAS 382. The CU 378 includes two registers having clock enables (such as 74FCT377). The registers receive DRAS 382 as input. The output of one of the registers is called RAS1 382A. The output of the other register is called RAS2 382B. The clock enables for the registers are derived from bit 20 of the address 230. RAS1 382A drives side 1 and RAS2 382B drives side 2 of the SIMMs.

During S2 610, either RAS1 382A or RAS2 382B is driven to the SIMM. If a refresh cycle 604 is being performed, then both RAS1 382A and RAS2 382B are driven in order to allow both sides of the SIMM to be refreshed together.

If a block read cycle is not being performed, then at S2 610 the CU 378 asserts GM_READY 212 in order to inform the common interface that the GMC 150 is ready to receive a new address.

At S3 612 the CU 378 selects a column address by disabling RASEN 698. GM_REQ 214 is asserted (and BGNT 650 is deasserted) at S4 614 if a memory read is being performed. GM_REQ 214 and BGNT 650 remain in these states until GM_GRANT 204 is asserted by the common interface 124 (in order to perform a read reply cycle).

At S4 614 the CU 378 decides whether to enter the page mode. If GM_NEAR 210 or BLKRD 410 is not asserted, then the CU 378 does not enter the page mode. If the current cycle is a write, then the CU 378 completes the random access cycle 602 by proceeding to S5 616, S6 618, and S7 620. In S5 616, S6 618, and S7 620, the CU 378 deasserts DRAS 382 and either RAS1 382A or RAS2 382B (corresponding to the SIMM side that was written). Also, the CU 378 asserts RASEN 698 to the address multiplexer 376 in order to prepare for the next memory cycle.

If the current cycle is a read, then the CU 378 completes the random access cycle 602 by proceeding to S5 616, S6 618, and S7 620. At S5 616, the CU 378 latches data into the data register 370, S5.

The CU 378 performs a page mode read if BLEN 234 is greater than zero or if GM_NEAR 210 is asserted and WRITE 599 is not asserted. Such conditions indicate that the present cycle is a memory read and that the common interface 124 has detected that the next memory access has the same row address as the preceding memory access.

Referring now to FIG. 7, the CU 378 processes page mode reads by entering S7R 704. The CU 378 enters SSR 706, where CAS 386 is deasserted and the data is latched into the data register 370. At S12R 708 the CU 378 waits for either RDREQ 412, WRREQ 408, or REFRESH 206 (also called GM_REFRESH 206).

If RDREQ 412 is asserted at S12R 708, then the CU 378 moves to S9R 710, but only if the previous read reply has been read by the common interface 124. If not, the CU 378 remains at S12R 708 until the common interface 124 asserts GM_GRANT 204 or REFRESH 206.

If the common interface 124 simultaneously asserts GM_GRANT 204 and REFRESH 206, then the CU 378 does not refresh the DRAM 378 until the next read cycle is completed.

If the common interface 124 asserts REFRESH 206 alone, then the CU 378 moves from S12R 708 to S13R 630, S6A 632, S6 618, S7 620, and S0 606. Since a refresh is pending, the CU 378 immediately begins a refresh cycle 604 by going to S8 622.

If WRREQ 408 is asserted (indicating that a write cycle is pending) when the CU 378 enters S12R 708, then the CU 378 proceeds to S11R 714 before entering the page mode write cycle at SSW 806 in FIG. 8. This path allows three cycles to pass before the CU 378 starts a near write cycle (with CAS 386 asserted). The three cycles are necessary to latch in write data, enable the data register 370, and to drive RAM_WRITE 388 to the DRAM 380.

If at S12R 708 RDREQ 412 is asserted and there are no pending read reply cycles, then the CU 378 performs the next memory read in page mode. A page mode loop includes S9R 710, S10R 712, S8R 706, and S12R 708. The CU 378 asserts CAS 386 at S9R 710 and S10R 712. The CU 378 latches data at S10R 712.

At S10R the CU 378 exits the page mode loop and moves to S13R 630 if a refresh is pending or if neither GM_NEAR 210 or BLKRD 410 is asserted. At S12R 708 the CU 378 exits the page mode loop and moves to S13R 630 if RDREQ 412 is not asserted or if the CU 378 is waiting for GM_GRANT 204.

At S10R 712 the CU 378 samples GM_NEAR 210 and BLKRD 410 to determine whether to continue the page mode loop. GM_NEAR 210 is driven by the common interface 124 and must be asserted at S10R 712 in order to continue in the page mode loop. BLKRD 410 is generated by the CU 378 and must be asserted at S4 614 to start a block read cycle and deasserted at S10R 712 to end a block read cycle.

The common interface 124 initiates block read cycles by scheduling a memory read with BLEN 234 greater than 0. The CU 378 converts BLEN 234 to a number that is 2 to the nth power, where n equals BLEN 234. The result is stored in a decrementing counter that decrements after each read.

BLKRD 410 remains asserted until the decrementing counter decrements to zero and page mode reads are performed (assuming a refresh does not abort the page mode reads). The decrementing counter is decremented during S7R 704 or S10R 712. A column address (corresponding to CAS 386) is incremented during the following cycle and RDREQ 412 is asserted during the next following cycle. Note that, if at S10R 712, REFRESH 206 is asserted, then the CAS address is incremented and RDREQ 412 is asserted during S13R 630 and S6A 632, respectively.

Referring to FIG. 8, the CU 378 performs a page mode write if GM_NEAR 210 is asserted and WRITE 599 is asserted at S4. The CU 378 processes page mode writes by entering S7W 804.

From S7W 804 the CU 378 continues to SSW 806, where CAS 386 is deasserted. At S12W 808 the CU 378 waits for either RDREQ 412, WRREQ 408, or REFRESH 206. If WRREQ 408 is asserted at S12W 808, then the CU 378 moves to S9W 810 unconditionally.

If REFRESH 206 is asserted and WRREQ 408 is not asserted, then the CU 378 proceeds to S13R 630, S6A 632, S6 618, S7 620, and S0 606. A refresh is pending so the CU 378 initiates a refresh cycle 604 by moving to S8 622.

If, at S12W 808, RDREQ 412 is asserted (that is, a read cycle is pending), then the CU 378 proceeds to S11W 814 before entering the page mode read cycle loop at S12R 708. This path allows two cycles to pass before starting the near read cycle (with CAS 386 asserted). The two cycles are necessary in order to disable the data register 370 and to drive RAM_READ 392 (that is, RAM output enable) to the DRAM 380.

If, at S12W 808, WRREQ 408 is asserted, then the CU 378 performs the next write in page mode. A page mode write loop includes S9W 810, S10W 812, S8W 806, and S12W 808. The CU 378 asserts CAS 386 at S9W 810 and S10W 812.

At S10W 812, the CU 378 exits the page mode write loop to S13W 630 if a refresh is pending or GM_NEAR 210 is not asserted. The CU 378 breaks the page mode write loop at S10W and at S12W if WRREQ 408 is not asserted.

The CU 378 samples GM_NEAR 210 at S10W 812 to continue in the page mode write loop. If the common interface 124 drives GM_NEAR 210 and GM_LDMAR 202 as fast as possible, then near write operations can occur every four clock cycles.

The CU 378 asserts GM_READY 212 at S12W 808 or SSW 806 if WRREQ 408 is asserted during those states. If LOCMAR 302 is asserted during SSW 806 then SSW 806 is repeated for one cycle. If LOCMAR 302 is asserted at S12W 808 then the CU 378 proceeds to SSW 806 for one cycle before proceeding. This allows time for a new WREN 328 to propagate to the DRAM 380 as RAM WRITE 388.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A multi-level memory system used in a multiprocessor computer system having a global bus and a plurality of processors coupled to said global bus, said memory system comprising:

a plurality of memory cards coupled to the global bus, wherein said memory cards are accessed and operate independently of one another, each of said memory cards comprising:

(1) interface means coupled to the global bus, wherein said interface means includes means for buffering memory access requests and data received from said processors via said global bus;

(2) a local bus coupled to said interface means; and (3) multiple interleaved memory banks coupled to said local bus, wherein said memory banks are accessed and operate independently of one another, each of said memory banks comprising:

(a) memory means for storing data;

(b) means for sending a READY signal to said interface means when said each of said memory banks is ready to receive a memory access request;

(c) means for receiving from said interface means via said local bus a memory access request addressed to said each of said memory banks;

(d) means for accessing said memory means as specified by said memory access request received from said interface means to retrieve data from said memory means; and (e) means for transferring said data retrieved from said memory means to said interface means via said local bus;

wherein said interface means comprises:

(a) means for transferring a memory access request to one of said memory banks independent of any past transfers of memory access requests to any others of said memory banks and independent of processing of any memory access requests previously transferred to said any others of said memory banks; and (b) means for receiving data from said one of said memory banks independent of any past transfers of memory access requests from said interface means to said any others of said memory banks and independent of processing of any memory access requests previously transferred to said any others of said memory banks.

2. The memory system of claim 1, wherein said interface means further comprises:

means for requesting the global bus; and means for transferring data stored in said interface means to a memory access requestor via the global bus once the global bus is granted.

3. The memory system of claim 1, wherein said interface means further comprises:

means for performing error detection and correction of data stored in said interface means.

4. The memory system of claim 3, wherein said means for performing error detection and correction comprises:

means for calculating error correction codes during write operations;

means for verifying said error correction codes during read operations; and means for correcting errors during said read operations.

5. The memory system of claim 1, wherein said interface means further comprises:

means for locking memory in said memory means.

6. The memory system of claim 5, wherein said means for locking memory comprises:

means for locking a memory location when a memory access requestor reads said memory location with a lock bit set;

means for allowing said memory access requestor to access said locked memory location;

means for prohibiting access to said locked memory location by other memory access requestors; and means for unlocking said locked memory location when said memory access requestor writes to said locked memory location with said lock bit set.

7. The memory system of claim 5, wherein said means for locking memory comprises means for locking a memory location by performing an indivisible test-and-set operation on said memory location when a memory access requestor reads said memory location with a lock bit set, wherein said memory location is automatically unlocked when said test-and-set operation completes.

8. The memory system of claim 1, wherein said means for accessing said memory means comprises:

means for using a random access mode to access said memory means when consecutive memory access requests have different row addresses; and means for using a page mode to access said memory means when said consecutive memory access requests have common row addresses.

9. The memory system of claim 1, wherein said means for transferring said retrieved data from said memory means to said interface means comprises:

means for requesting said local bus; and means for transferring said retrieved data from said memory means to said interface means via said local bus once said local bus is granted.

10. The memory system of claim 1, further comprising:

self-configuration means for automatically configuring said memory system, said self-configuration means comprising:

1. means for determining an interleave factor of said memory system;

2. means for determining a memory capacity of said memory system; and 3. means for determining an address space for each of said memory cards.

11. The memory system of claim 1, wherein said memory means comprises a dynamic random access memory having a page access mode.

12. The memory system of claim 1, wherein each of said memory banks further comprises:

means for scheduling memory access requests stored in said register means for processing, wherein scheduling of said memory access requests for processing is performed independently of other of said memory banks.

13. A computer system comprising:

(1) a global bus;

(2) a plurality of processors coupled to said global bus; and (3) a shared memory subsystem comprising one or more memory cards coupled to said global bus, wherein said memory cards are independently operated and accessed, each of said memory cards comprising:

(a) interface means coupled to said global bus, said interface means including means for buffering memory access requests and data received from said processors via said global bus;

(b) a local bus coupled to said interface means; and (c) multiple interleaved memory banks coupled to said local bus, wherein said memory banks are accessed and operated independently of one another, each of said memory banks comprising:

memory means for storing data;

means for sending a READY signal to said interface means when said each of said memory banks is ready to receive a memory access request;

means for receiving from said interface means via said local bus a memory access request addressed to said each of said memory banks;

means for accessing said memory means as specified by said memory access request received from said interface means to retrieve data from said memory means; and means for transferring said data retrieved from said memory means to said interface means via said local bus;

wherein said interface means comprises:

means for transferring a memory access request to one of said memory banks independent of any past transfers of memory access requests to any others of said memory banks and independent of processing of any memory access requests previously transferred to said any others of said memory banks; and means for receiving data from said one of said memory banks independent of any past transfers of memory access requests from said interface means to said any others of said memory banks and independent of processing of any memory access requests previously transferred to said any others of said memory banks.

14. The computer system of claim 13, wherein said interface means further comprises:

means for requesting said global bus; and means for transferring data stored in said interface means to a memory access requestor via said global bus once said global bus is granted.

15. The computer system of claim 13, wherein said interface means further comprises:

means for performing error detection and correction of data stored in said interface means.

16. The computer system of claim 15, wherein said means for performing error detection and correction comprises:

means for calculating error correction codes during write operations;

means for verifying said error correction codes during read operations; and means for correcting errors during said read operations.

17. The computer system of claim 13, wherein said interface means further comprises:

means for locking memory in said memory means.

18. The computer system of claim 17, wherein said means for locking memory comprises:

means for locking a memory location when a memory access requestor reads said memory location with a lock bit set;

means for allowing said memory access requestor to access said locked memory location;

means for prohibiting access to said locked memory location by other memory access requestors; and means for unlocking said locked memory location when said memory access requestor writes to said locked memory location with said lock bit set.

19. The computer system of claim 17, wherein said means for locking memory comprises means for locking a memory location by performing an indivisible test-and-set operation on said memory location when a memory access requestor reads said memory location with a lock bit set, wherein said memory location is automatically unlocked when said test-and-set operation completes.

20. The computer system of claim 13, wherein said means for accessing said memory means comprises:

means for using a random access mode to access said memory means when consecutive memory access requests have different row addresses; and means for using a page mode to access said memory means when said consecutive memory access requests have common row addresses.

21. The computer system of claim 13, wherein said means for transferring said data retrieved from said memory means to said interface means comprises:

means for requesting said local bus; and means for transferring said data retrieved from said memory means to said interface means via said local bus once said local bus is granted.

22. The computer system of claim 13, wherein said shared memory subsystem further comprises:

self-configuration means for automatically configuring said shared memory subsystem, said self-configuration means comprising:

means for determining an interleave factor of said shared memory subsystem;

means for determining a memory capacity of said shared memory subsystem; and means for determining an address space for each of said memory cards.

23. The computer system of claim 13, wherein said memory means comprises a dynamic random access memory having a page access mode.

* * * * *